United States Patent

Gimenez et al.

[11] Patent Number: 5,809,448
[45] Date of Patent: Sep. 15, 1998

[54] POSITION DETECTOR SYSTEM FOR GUIDE VEHICLES

[75] Inventors: Jose Gernan Gimenez; Juan Felix Garcia, both of Beasain, Spain

[73] Assignee: Construcciones y Auxiliar de Ferrocarriles, S.A., Spain

[21] Appl. No.: 556,272

[22] Filed: Nov. 13, 1995

[51] Int. Cl.[6] ........................................... B61D 9/14
[52] U.S. Cl. ..................... 701/213; 701/205; 701/72; 701/19; 246/1 R; 246/122 R
[58] Field of Search ................ 364/449.7, 424.028, 364/424.029, 426.05, 447, 426.016; 246/62, 122, 177, 182 R, 1 R

[56] References Cited

U.S. PATENT DOCUMENTS

| | | | |
|---|---|---|---|
| 3,655,962 | 4/1972 | Koch | 246/182 C |
| 3,789,769 | 2/1974 | Strohmer et al. | 105/164 |
| 4,041,283 | 8/1977 | Mosier | 235/150.2 |
| 4,042,810 | 8/1977 | Mosher | 235/150.2 |
| 4,459,668 | 7/1984 | Inoue et al. | 364/426 |
| 5,072,900 | 12/1991 | Malon | 246/5 |
| 5,533,695 | 7/1996 | Heggestad et al. | 246/62 |
| 5,615,116 | 3/1997 | Gudat et al. | 364/423.098 |

Primary Examiner—Kevin J. Teska
Assistant Examiner—Russell W. Frejd
Attorney, Agent, or Firm—Bierman, Muserlain and Lucas

[57] ABSTRACT

The position detector system for guided vehicles has a memory block which stores each journey, divided into sections identified by their theoretical parameters and in which the correction curves are stored; at least one recording unit sensitive to travel in a curve and a relative position recording unit, signals from which are sent to a control unit which using the signals, establishes the profile of variations of the actual parameters of the correction curves and carried out an adjustment based upon achievement of the minimum error in the profiles of coordinates obtained from the theoretical parameters and the actual parameters, determining the absolute real position of the vehicle. The system is especially suited for the railway rolling stock industry.

6 Claims, 1 Drawing Sheet

POSITION DETECTOR SYSTEM FOR GUIDE VEHICLES

BACKGROUND OF THE INVENTION

1. Filed of the Invention

Any guided vehicle like a railway system, of vehicles inside major factories or other means of transport, would be improved if its tilting system, its speed control system, movement control of a vehicle without driver, etc were to use a position detector system.

The purpose of incorporating a tilting system is to achieve a reduction in travelling times and improve the journey comfort experienced by the traveller. Tilting gives the vehicle an additional differentiation in the curves, allowing them to be entered at greater speed.

2. Description of the Related Art

Conventional systems of tilting are based upon the detection of the curve in real time by incorporating into the system dynamic sensors such as gyroscopes and accelerometers. Operation of the tilting system adjusts to the signals perceived at each moment. This method of operation gives rise to a number of problems in the system, such as mentioned below:

Triggering of the system on the vehicle is always delayed due to the need to record the curve beforehand and to distinguish it from some track disturbance or irregularity.

Tilting movements are abrupt through the need to make up for the time lost in detecting the curve.

Operation is subject to continuous corrections of instructions which give rise to disorientation and discomfort for the passenger.

Tilting does not take into account the basic parameters of the curve in which it is operated like: radius of curvature, inner and outer rail differentiation, lengths of the transition curves etc. This lack produces an effect of unease in the passenger, since the line of tilting followed by the vehicle is not the best for the passenger.

SUMMARY OF THE INVENTION

The applicant has shown that the basic problem to be solved in a tilting system is related to lack of knowledge by the vehicle/driver of the real position of the vehicle on its route. For this the applicant has developed a position detector system based upon knowledge of the position of the vehicle in the train on the track and on fore knowledge of the route corresponding to the journey being undertaken.

The system in the invention continually identifies the linear velocity of movement and the absolute position of the vehicles over a known journey.

The method of calculating the absolute position of the vehicle is based upon measurement of the incremental variation of its position corrected In curves by means of the use of the dynamic signals from the vehicle which are sensitive to the characteristics of the curves encountered.

The position detector system for guided vehicles of the present invention is characterized by the fact that it has:

(a) a memory block in which there is stored each journey, divided into sections identified by their theoretical absolute position parameters, length and radius and in which the correction curves are stored;

(b) at least one recording unit sensitive to travel in a curve and a relative position recorder, signals from which are sent to (c) a control unit, which using these signals establishes the variation profile of the actual correction curves parameters and undertakes an adjustment based upon achieving the minimum error in the profiles of coordinates obtained using the theoretical parameters and the actual parameters, determining the absolute real position of the vehicle.

The position detector system for guided vehicles of the present invention is also characterized by the fact that the recording unit sensitive to travelling in a curve is a sensor for measuring the turning velocity in a bend of the vehicle and the relative position recording unit supplies information to measure the variation of the position of the vehicle and its absolute speed in the direction of travel.

The position detector system for guided vehicles of the present invention is also characterized by the fact that for each correction curve:

(a) the curve is divided into an entry transition curve, the curve itself and an exit transition curve, produced from a theoretical curve of coordinates, its theoretical parameters being the inverse of its radii as ordinates and its lengths as abscissas;

(b) the center of gravity of the area of the theoretical curve is calculated;

(c) an actual curve is produced, with the same coordinates as the theoretical curve, using the actual parameters calculated from the information supplied by the curve detection sensor and the relative position recording unit;

(d) the center of gravity of the area of the actual curve is calculated;

(e) the difference in value of the data for the center of gravity of the theoretical and the actual curve is obtained, the value of the said difference then being used to correct the absolute position data.

The position detector system for guided vehicles of the present invention is also characterized by the fact that for each correction curve:

(a) the curve is divided into an entry transition curve, the curve itself and an exit transition curve, producing a theoretical curve of coordinates, its theoretical parameters being the inverse of its radii as ordinates and its lengths as abscissas;

(b) the position, as abscissa, of the center of gravity of the theoretical incline corresponding to the transition curve is calculated;

(c) an actual curve is produced, with the same coordinates as the theoretical curve, using the actual parameters calculated from the information supplied by the curve detection sensor and the relative position recording unit;

(d) the position, as abscissa, of the center of gravity of an incline adjusted to the actual transition curve and parallel to the theoretical incline is calculated;

(e) the difference in value between the position as abscissas of the data between the centers of gravity of the theoretical incline and the adjusted incline is obtained, the value of such difference then being used to correct the absolute position data.

The position detector system for guided vehicles of the present invention is also characterized by the fact that it has (a) a series of signal beacons placed along the route to be covered and at points of which the absolute position is known;

(b) means for recognition that the vehicle is passing the beacon.

The position detector system for guided vehicles of the present invention is also characterized by the fact that it has equipment which detects the absolute position of the vehicle via satellite.

DESCRIPTION OF THE PREFERRED EMBODIMENTS

In what follows, we describe an example of practical implementation of the present invention which is not limitative. We do not in any way discount, other forms of implementation in which additional changes are introduced which do not detract from the fundamental principle; on the contrary, the present invention also embraces all its variants.

Figure 1:
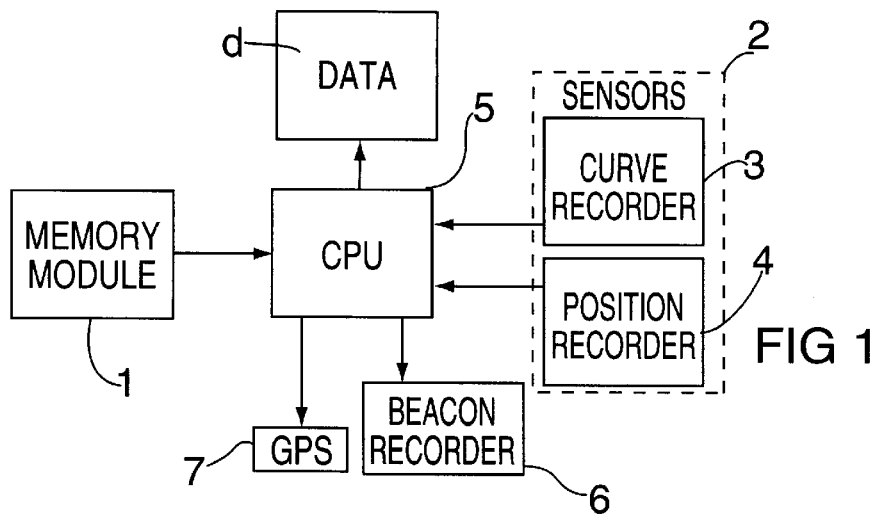
FIG. 1 is a block diagram of the system which is the subject of the invention.

In FIG. 1 we see:

A memory module (1) containing the information on the journey which the vehicle can carry out. The journey is divided into sections, each section being identified by its parameters (absolute position, radius (R) of section, length of section).

A set of sensors (2), for example two, which give three dynamic parameters:

Recorder sensitive to movement in a curve (3), for example a sensor to measure the speed of turn of the vehicle in a bend (angular velocity of the vehicle related to a perpendicular axis in the plane of movement). The speed of turn of the vehicle in a bend can be obtained indirectly with the data coming from recorders based upon measurement of lateral accelerations, lateral displacements of the suspension elements, etc.

In physical and mathematical terms, these variables are related to each other, such that the positioning of the sensor or Its nature can be optional, provided that its application is as indicated.

A relative position recorder (4) to measure the variation in position of the vehicle and its absolute velocity in the direction of movement. By way of example, this sensor is fitted in one or more wheels of the vehicle, in such case involving an encoder which reports the angle through which the wheel has turned in relation to the chassis of the vehicle. This measurement directly provides the variation in position of the vehicle. The absolute speed in the direction of movement is obtained by passing the previous signal through a frequency-voltage converter or also by means of a pulse counter for constant intervals of time.

A control unit CPU (5) with calculating capacity sufficient to evaluate the control algorithms which the system needs and to supply the necessary data (d) for example, position and velocity.

The basic system can be supplemented and improved by two other elements whose incorporation is optional. One could add one or the other, both or neither, depending upon the possibilities for their use. Although not essential for the operation of the system, their use improves the robustness and ease of use of the ultimate system. They are:

Beacon recording equipment (6). This equipment records a series of beacons placed along the route to be followed at points whose precise absolute position is known. When the equipment detects a beacon, it notifies the CPU (5) of the system directly and this consults its memory (1) to find the corresponding absolute position. The beacons used can be active (with electrical connection to an external or internal power supply source) and/or passive (without electrical connection to any power supply source).

GPS (global positioning system) (7). Global positioning systems are equipment able to detect the absolute position of a receiver located at any point on the earth. They utilize information obtained from satellites which circle the earth in non-geostationary orbits. When the vehicle is stationary, the information obtained from a GPS receiver allows an initial value to be obtained.

In what follows we describe an example of practical implementation in operation.

The vehicle commences to travel from an initial absolute position which has been provided by automatic means (end of track, beacon, GPS, for example) or by manual means (keyboard). Afterwards the control unit (5) uses the information obtained from the relative position sensor (4) to update the absolute position of the vehicle. Measurements like this sensor (4) can be affected by various sources of error, such as: wear of the measurement wheel, variations in diameter of the wheel, variations in the course followed by the wheel, skidding during the phases of traction and braking of the vehicle, etc. This means that measurements of absolute position obtained with the position sensor (4) may not be entirely accurate. In order to improve accuracy, the system incorporates algorithms intended to correct the position of the vehicle calculated with the information from the position measuring unit. These correction algorithms are based upon the identification/parameters of the actual curves via analysis of the dynamic operating data obtained from the signals received from sensors (3, 4) and by comparing them with the theoretical data for the journey incorporated beforehand in the memory module (1).

This analysis consists of adjusting the profile in coordinates of the signal received via sensors (3 and 4) for an actual curve with the theoretical profile of the same curve which has been recorded in the memory (1). This adjustment can be based upon achieving the minimum error between the two curves, the theoretical one and the experimental one, according to the coordinates.

Figure 2:
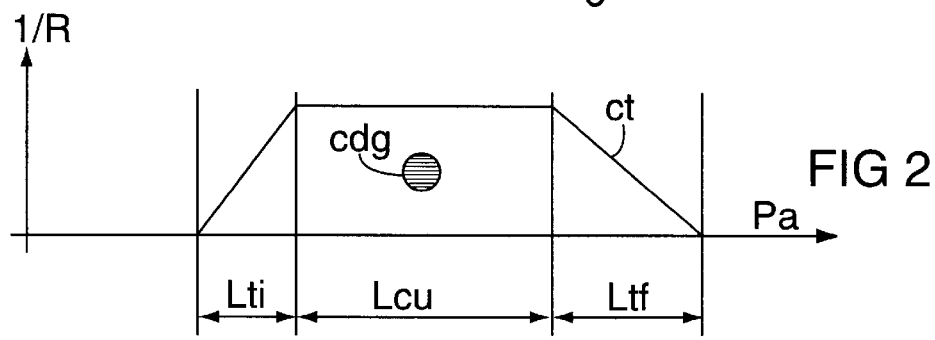
FIG. 2 is a representation in coordinates of the plot of a curve of a route to be covered by the vehicle.
Figure 3:
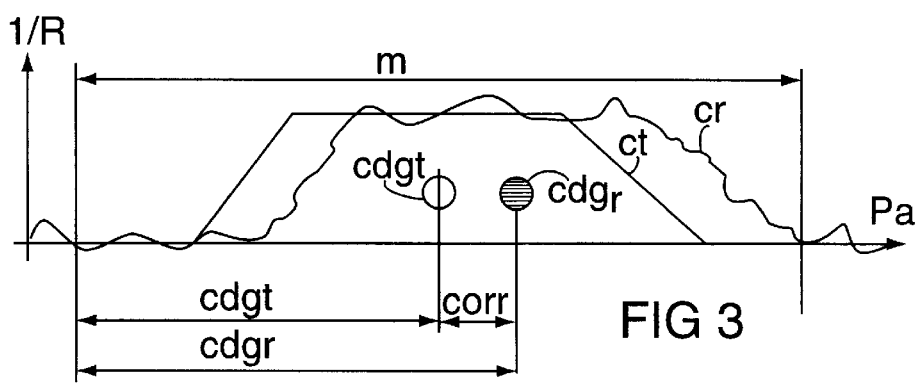
FIG. 3 is a comparative representation between the curve in FIG. 2 and the actual curve obtained for a practical implementation of the system.

Below we set out, by way of example, two methods of adjustment which can be used. One is based upon adjustment by center of gravity and the other is based upon adjustment of the transition curve:

Method 1: adjustment of the center of gravity (FIGS. 2 and 3)

Along the route there are a number of curves which, due to their characteristics in that they are greater than a pre-fixed radius threshold, have been taken as correction curves. We know their radius of curvature (R), the length of the transition curves on entry (Lti) and on exit (Ltf) and the length of the curve (Lcu), as can be seen in FIG. 2 (theoretical curve (ct)) as such, in which the ordinates are the inverse radius (I/R) and the abscissas are their lengths indicating the absolute position (Pa).

With the data for the curve referred to previously, one can obtain the center of gravity (cdg) of the figure compared with an axis, for example, the ordinate axis.

The vehicle continually records the signals obtained from the curve detection sensor (3), measuring the angular velocity in the bend (fidot) and from the position recorder (4) which supplies the movement velocity (vel) at constant intervals of displacement (deltas). When the vehicle is approaching a correction curve, with the data obtained from the sensors/recorders (3), (4) operates giving rise to the figures representing the actual curve (cr) with the actual figures of radius of curvature and position. This operation is carried out for all the samples found in the journey where it is assumed that there is the curve of correction with a margin of displacement in front of and behind the curve, i.e. the sampling of data commences a little before the curve and finishes a little after it (zone m). In FIG. 3 one can see the comparison between the profile of the actual measurement (cr) and the theoretical data (ct) of a curve in which the absolute position of the vehicle is in advance of the theoretical one.

After this, and after the entire correction curve has been passed through, the center of gravity (cdgr) is calculated for the mathematical real curve compared with the beginning, by means of a conventional mathematical function.

This real value for the center of gravity (cdgr) is compared with the theoretical value (cdgt) which is stored in the memory. The difference between the real value and the theoretical one provides the correction (corr) between the real position of the vehicle and the theoretical one.

$$corr = cdgr - cdgt$$

Before the absolute position data for the vehicle is updated with the new position, a security test is carried out: the absolute value of the correction (corr) must be below a threshold correction value (corr.um.). Should this not be the case, the correction (corr) is made equal to the value of the threshold correction, with the sign of corr.

Once this check has been completed, the absolute position value (pos-abs) is renewed in the following manner:

$$pos\text{-}abs = pos.abs - corr$$

The absolute position value will continue to be renewed using this new value.

Method 2: adjustment of the transition curve

Figure 4:
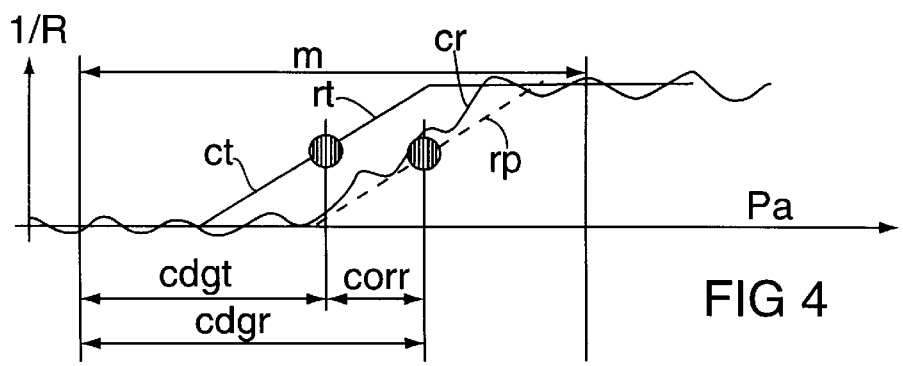
FIG. 4 is a comparative representation between the curve in FIG. 2 and the actual curve obtained through another practical implementation of the system.

This variant is based upon adjustment of the transition curve, both on entry and on exit. Let us assume the circumstances in FIG. 4 in which the vehicle will be ahead of the theoretical route.

Now the correction algorithm will attempt to calculate the value of corr $$corr = cdgr - cdgt$$

using as basis an adjustment depending upon the minimum error between the actual curve and an incline parallel to that of the theoretical curve. The method is exactly the same as the previous one, except that in that part of the calculation of cdg−cdgr it is the distance which exists between the reference for the measurements and the position in the abscissas of the center of gravity of the incline parallel (rp) to the theoretical incline (rt) which provides the minimum error adjustment with the actual curve (cr).

If the system is equipped with beacon recognition facilities (6) the following process will be carried out in parallel to the previous one.

1. The fact that beacon is being passed is recognized and its reference is determined.

2. With the beacon reference the data base for beacons in the memory (1) is consulted and the absolute position associated with the beacon in question is obtained (pos.bal).

3. From this moment, the figure for the absolute position of the vehicle will be the absolute position value associated with the beacon.

$$pos.abs = pos.bal$$

If in its turn the system has a GPS (7), one can either carry out a process analogous to the previous one, or a security process for the benefit of the updated information. The steps to be taken are as follows:

1. When the vehicle is stationary the information received by the GPS (longitude and latitude of the position of the vehicle) is processed during a certain lapse of time and a measurement is calculated of the coordinates of longitude and latitude.

2. With the coordinates already measured, the data base of the memory of the system is consulted and with these coordinates there is associated a value for the absolute position of the vehicle (pos.gps).

3. The correction (corr) is calculated as the difference between the actual position value (pos.abs) and the position obtained through the GPS (pos.gps).

$$corr = (pos.abs - pos.gps).$$

4. If the correction value is below a threshold value for the GPS corrections (corr-um.gps) the data for the actual position (pos.abs) is to be taken as valid. This threshold value is strictly linked with the accuracy of the GPS. Otherwise, the updated value for the position (pos.abs) is replaced by the GSP value (pos.gps).

We claim:

1. A position detector system for a guided vehicle comprising:

a) a memory block in which is stored each journey, divided into sections identified by a profile of theoretical parameters, and in which a profile of threshold correction parameters are stored;

b) a curve recorder for recording actual parameters relating to travel of the vehicle in a curve and a relative position recorded for recording actual parameters relating to forward movement of the vehicle, both curve recorder and relative position recorder generating signals which are sent to c) a control unit, which uses these signals to establish a profile of actual correction curves parameters and undertakes an adjustment based upon achieving a minimum error between the profile of theoretical parameters and the profile of actual parameters, and determines the actual position of the vehicle.

2. The position detector system of claim 1 wherein the curve recorder is a sensor for measuring the turning velocity of the vehicle in the curve in which the vehicle is travelling and the relative position recorder is a sensor for measuring variation of position of the vehicle and absolute speed of the vehicle in the direction of travel of the vehicle.

3. The position detector system of claim 1 wherein said control unit employs the following steps to make the adjustment:

a) producing a plot of theoretical parameters of the curve in which the vehicle is travelling and dividing the plot of theoretical parameters into an entry transition curve, the curve itself and an exit transition curve, wherein the plot of theoretical parameters is a graphic representation of the profile of the theoretical parameters wherein coordinates of the graphic representation uses as an ordinate the inverse of the radii of the curve and as an abscissas the lengths of the curve;

b) calculating a center of gravity of the area under the plot of theoretical parameters;

c) producing a plot of actual parameters of the curve in which the vehicle is travelling wherein the plot of actual parameters is a graphic representation of the profile of actual parameters and uses the same coordinates as the plot of theoretical parameters;

d) calculating a center of gravity of the area under the plot of actual parameters;

e) calculating a difference in value between the center of gravity of the plot of theoretical parameters and the center of gravity of the plot of actual parameters and using the difference in value to correct the actual position data.

4. The position detector system of claim 1 wherein said control unit employs the following steps to make the adjustment:

a) producing a plot of theoretical parameters of the curve in which the vehicle is travelling and dividing the plot of theoretical parameters into an entry transition curve, the curve itself and an exit transition curve, wherein the plot of theoretical parameters is a graphic representation of the profile of the theoretical parameters wherein coordinates of the graphic representation uses as an ordinate the inverse of the radii of the curve and as an abscissas the lengths of the curve;

b) calculating a center of gravity of the area under the plot of theoretical parameters and calculating an abscissa value for a point on the plot of theoretical parameters where the ordinate for the plot of theoretical parameters is the same as the ordinate for the center of gravity of the plot of the theoretical parameters;

c) producing a plot of actual parameters of the curve in which the vehicle is travelling wherein the plot of actual parameters is a graphic representation of the profile of actual parameters and uses the same coordinates as the plot of theoretical parameters;

d) calculating a center of gravity of the area under the plot of actual parameters and calculating an abscissa value for a point on the plot of actual parameters where the ordinate for the plot of actual parameters is the same as the ordinate for the center of gravity of the plot of actual parameters;

e) calculating a difference in value between the abscissas value calculated in 3(b) and the abscissas value calculated in 3(d) and using the difference in value to correct the actual position data.

5. The position detector system of claim 1 further comprising a) a series of signal beacons placed along the route to be travelled by the vehicle and at points of which the absolute position is known;

b) means for recognition that the vehicle is passing the beacon.

6. The position detector system of claim 1 further comprising a global positioning system which detects the absolute position of the vehicle via satellite.

\* \* \* \* \*